US012434954B2

(12) United States Patent
Nilsson et al.

(10) Patent No.: US 12,434,954 B2
(45) Date of Patent: Oct. 7, 2025

(54) LIFTING ATTACHMENT FOR LIFTING CONTAINERS

(71) Applicant: KONECRANES GLOBAL CORPORATION, Hyvinkää (FI)

(72) Inventors: Anders Nilsson, Hyvinkää (FI); Anders Sjöstrand, Hyvinkää (FI); Hannu Lindfors, Hyvinkää (FI); Juhani Lukkari, Hyvinkää (FI); Ari Bertula, Hyvinkää (FI); Turkka Heiska, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 377 days.

(21) Appl. No.: 17/999,751

(22) PCT Filed: May 26, 2021

(86) PCT No.: PCT/FI2021/050378

§ 371 (c)(1),
(2) Date: Nov. 23, 2022

(87) PCT Pub. No.: WO2021/240064

PCT Pub. Date: Dec. 2, 2021

(65) Prior Publication Data

US 2023/0234819 A1 Jul. 27, 2023

(30) Foreign Application Priority Data

May 27, 2020 (FI) ..................................... 20205548

(51) Int. Cl.
*B66F 9/14* (2006.01)

(52) U.S. Cl.
CPC ..................................... *B66F 9/14* (2013.01)

(58) Field of Classification Search
CPC .................................... B66F 9/14; B66F 7/28
See application file for complete search history.

(56) References Cited

U.S. PATENT DOCUMENTS 3,558,176 A 1/1971 Whiteman
3,899,205 A * 8/1975 Lanigan .................. B66C 1/663
294/67.31

FOREIGN PATENT DOCUMENTS

CN 201785172 U 4/2011
EP 2151413 A1 * 2/2010 .............. B66F 9/186
(Continued)

OTHER PUBLICATIONS

Canadian Requisition issued in corresponding Application No. 3,179,093 on May 10, 2024.
(Continued)

*Primary Examiner* — Gerald McClain

(74) *Attorney, Agent, or Firm* — Birch, Stewart, Kolasch & Birch, LLP

(57) ABSTRACT

A lifting attachment for lifting one or more containers, comprising a lifting attachment frame and an arm on each end of the lifting attachment frame, wherein the arm comprises an upper locking mechanism and a lower locking mechanism. Each arm further comprises a pivotable extension connected to an actuator, wherein a proximal end of the extension comprises a pivot point connecting the extension to the arm and a distal end of the extension comprises a support portion, wherein in a resting position the distal ends of the extensions are turned to move the support portions to each other and in an operating position the distal ends of the extensions are turned downwards for supporting the container from its side.

17 Claims, 7 Drawing Sheets

(56) References Cited

FOREIGN PATENT DOCUMENTS

| | | | | | |
|---|---|---|---|---|---|
| GB | 2272881 | A | | 6/1994 | |
| GB | 2575655 | A | | 1/2020 | |
| JP | 5796200 | U | * | 6/1982 | |
| JP | S5796200 | U | | 6/1982 | |
| JP | 0359985 | U | * | 6/1991 | |
| JP | H0359985 | U | | 6/1991 | |
| JP | 0769450 | A | * | 3/1995 | |
| JP | 09132397 | A | * | 5/1997 | |
| JP | H09132397 | A | | 5/1997 | |
| WO | WO-2018182487 | A1 | * | 10/2018 | ............. B66C 1/223 |

OTHER PUBLICATIONS

Extended European Search Report issued Dec. 7, 2023 in corresponding European Application No. 21814312.1.

* cited by examiner

LIFTING ATTACHMENT FOR LIFTING CONTAINERS

FIELD OF THE INVENTION

The present invention relates to a lifting attachment for simultaneously lifting and handling one or two containers, where both containers have the same width.

BACKGROUND OF THE INVENTION

Previously, empty or partially loaded freight containers are handled in a dock area, for example, by lifting one container on top of another container and then lifting the bottom container for moving both containers. Handling containers with such a manner is time consuming as the pile of two containers needs to be lowered first, and the top container removed, before further handling the bottom container. Also, lifting a single container from the ground, necessitates the upper container position of the attachment to be empty.

In some solutions, the single container is attached to a lifting attachment with horizontal twist-locks or hooks from longitudinal side of two upper longitudinal corner castings and lower part of the container is supported against a fixed support structure of the lifting attachment.

One solution is by lifting two containers with the same lifting attachment so that the second container is on top of the first and both containers are lifted at the same time with two horizontal twist-locks or hooks on upper longitudinal corner castings of the lower container and the upper container is secured by additional twist-locks of other mechanisms. With this system both containers are handled at the same time, which is the fastest way to handle two containers if the containers are picked from a stack. Stack means containers are arranged on top of each other, typically 6 to 8 containers high.

Another solution is to handle single containers separately in such a way that both containers are gripped from their upper corners from the top with vertical twist-locks and the lower part of the container is supported against the fixed support structure of the lifting attachment. In some cases, this is the fastest way to handle single containers but lifting two containers simultaneously is not possible.

With above-mentioned solutions, different lifting attachments are optimized with certain lifting conditions only and the lifting attachment cannot be changed easily from lifting one container to two containers while both of the containers are steadily secured.

BRIEF DESCRIPTION OF THE INVENTION

An object of the present invention is to solve at least some of the above-mentioned drawbacks and to provide a space saving and robust lifting attachment for lifting containers together or separately using the same lifting attachment instead of several different ones. The objects of the invention are achieved by an arrangement which is characterized by what is stated in the independent claims. The preferred embodiments of the invention are disclosed in the dependent claims.

BRIEF DESCRIPTION OF THE DRAWINGS

In the following, the invention will be described in greater detail by means of preferred embodiments with reference to the attached drawings, in which.

DETAILED DESCRIPTION OF THE INVENTION

Figure 1A:
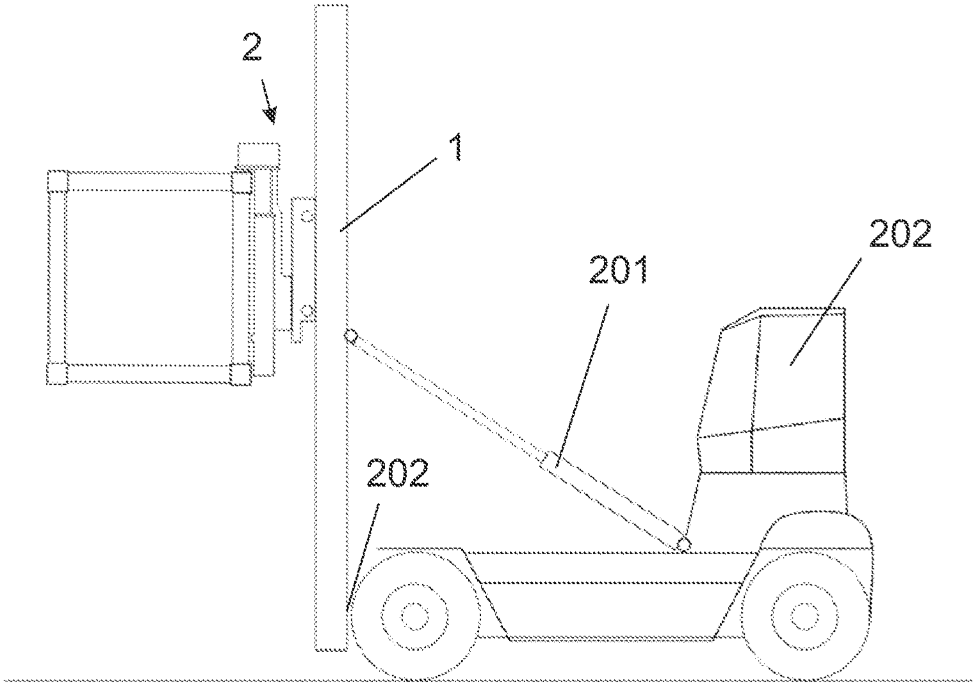
FIGS. 1A-1C illustrate a lifting attachment according to an embodiment.
Figure 1B:
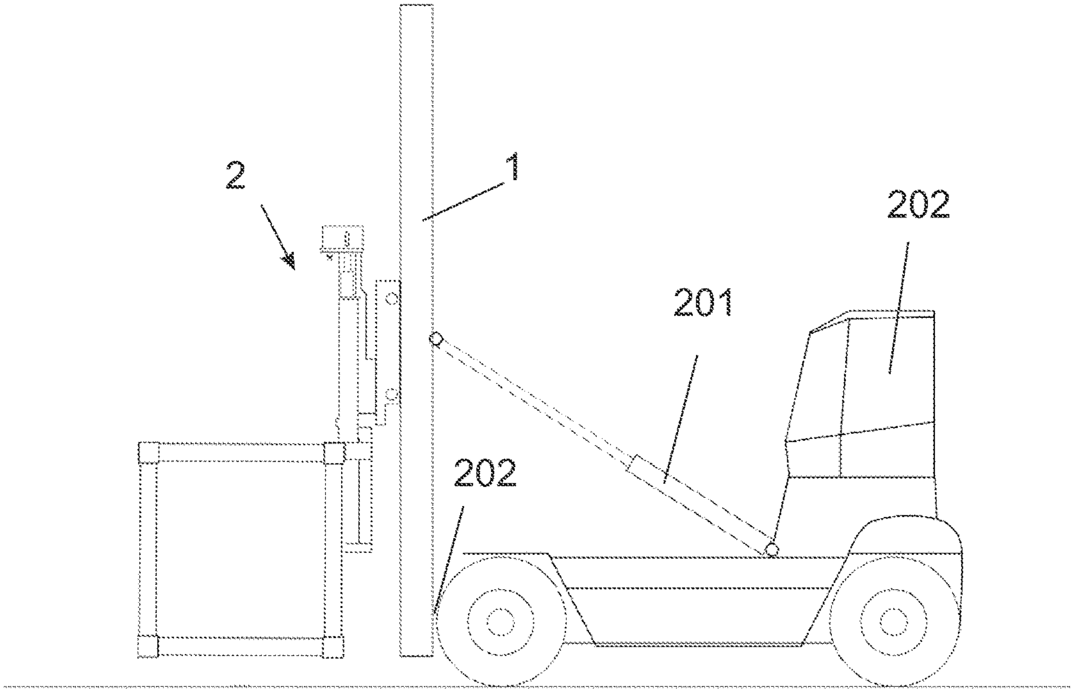
Figure 1C:
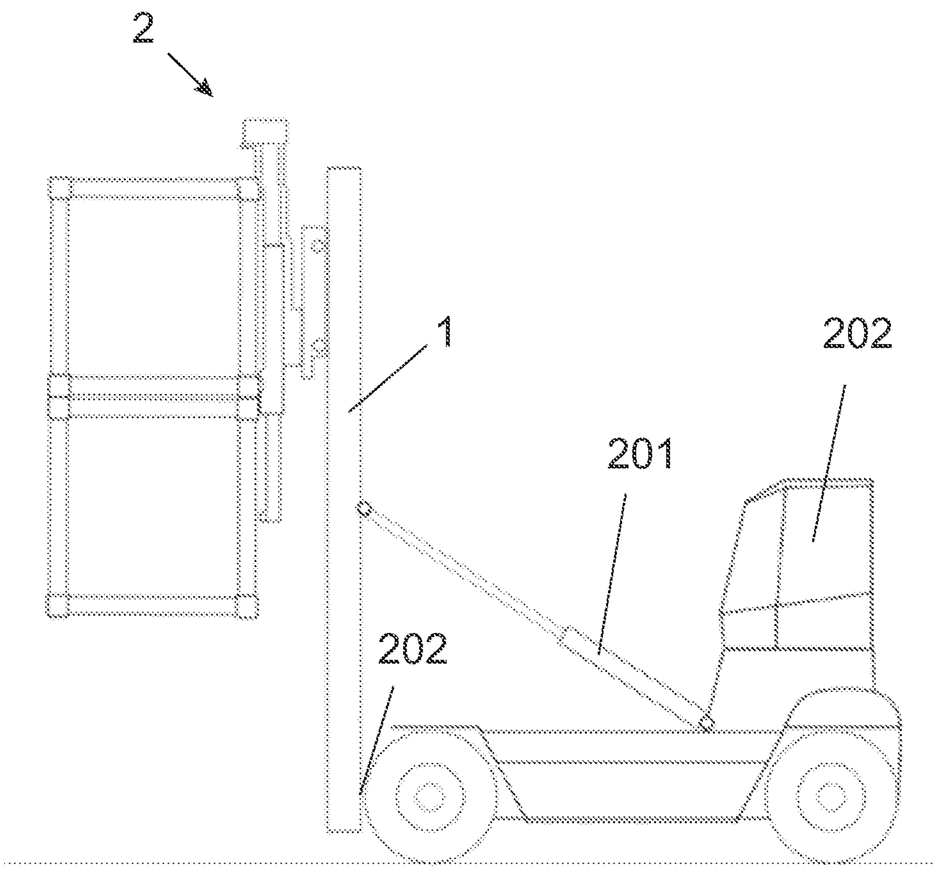

FIGS. 1A-1C illustrate a lifting device comprising an operator's cabin 202 and a lifting attachment 2 according to an embodiment, wherein FIG. 1A illustrates the lifting attachment 2 lifting a container with an upper locking mechanism 5, FIG. 1B illustrates the lifting attachment 2 lifting a container with a lower locking mechanism 6, and FIG. 1C illustrates the lifting attachment 2 lifting both upper and lower containers with the lower locking mechanism 6. In this context, the term "upper container" refers to the container which is being lifted mostly above the lower locking mechanism 6, and the term "lower container" refers to the container which is being lifted mostly below the lower locking mechanism 6.

The lifting attachment 2 can be connected to a lifting mast 1, which has an essentially vertical orientation. The orientation of the mast 1 may be adjustable for example by arranging a pivot joint 200 close to the lower end of the mast 1 to connect the mast 1 to the machine and further arranging an extending cylinder 201 in an upper level. The lifting attachment 2 could also be installed for example to an end of a boom type support instead of the lifting mast 1.

Freight containers are standardized, and each container has a corner casting on each corner of the container, resulting in eight corner castings in total on each container. Corner casting is a reinforced piece with oval holes (such as an oval hole 99 in FIG. 5) on each visible surface which are also standardized for lifting the container. The container is lifted from said corner castings. Each corner casting has oval holes 99 for lifting on the two vertical sides and on the one horizontal side of the container to allow lifting the container by connecting locking mechanisms to the corner casting, One locking mechanism, known as a twist-lock, has a cross-section that corresponds to the oval hole 99 in the corner casting, and locking is achieved by rotating the twist-lock 90° after it has been inserted into the oval hole 99 of the corner casting. The end of a twist-lock is tapered, to enable self-alignment with the oval hole 99 in the corner casting.

The lifting attachment 2 is used to grab one or two empty or partially loaded containers simultaneously or separately and transport containers and land one or two container simultaneously or separately with the lifting device such as a lift truck.

Figure 2A:
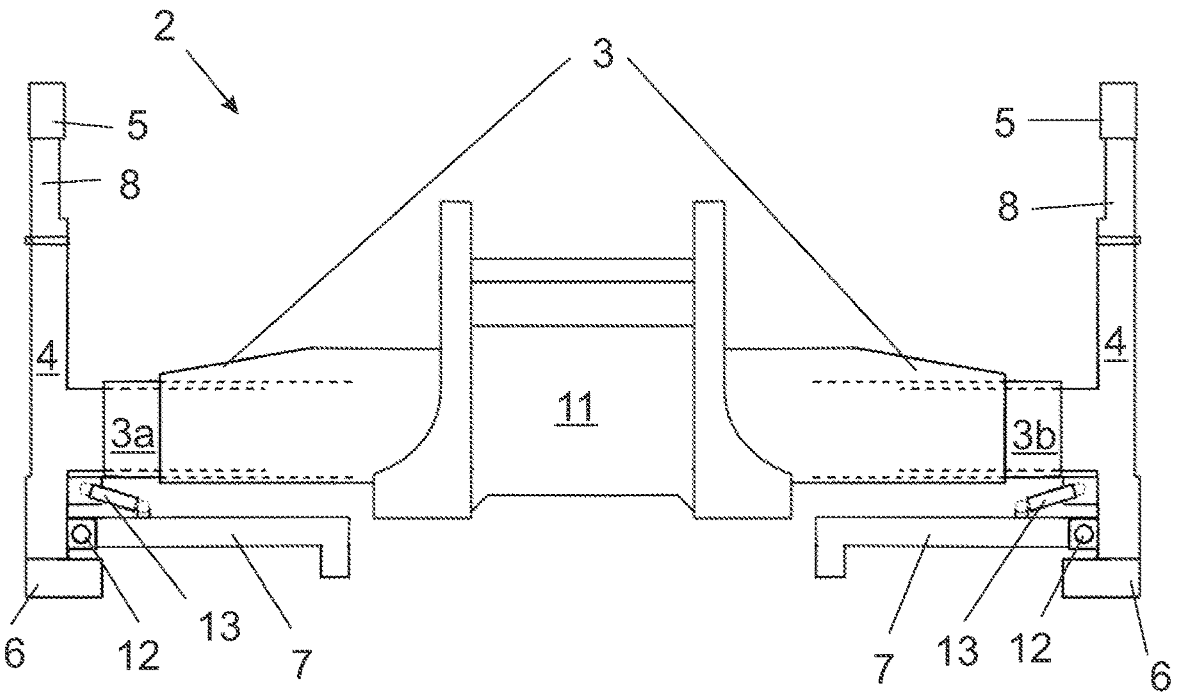
FIGS. 2A and 2B illustrate a back view of a lifting attachment according to the embodiment of FIGS. 1A-1C.
Figure 2B:
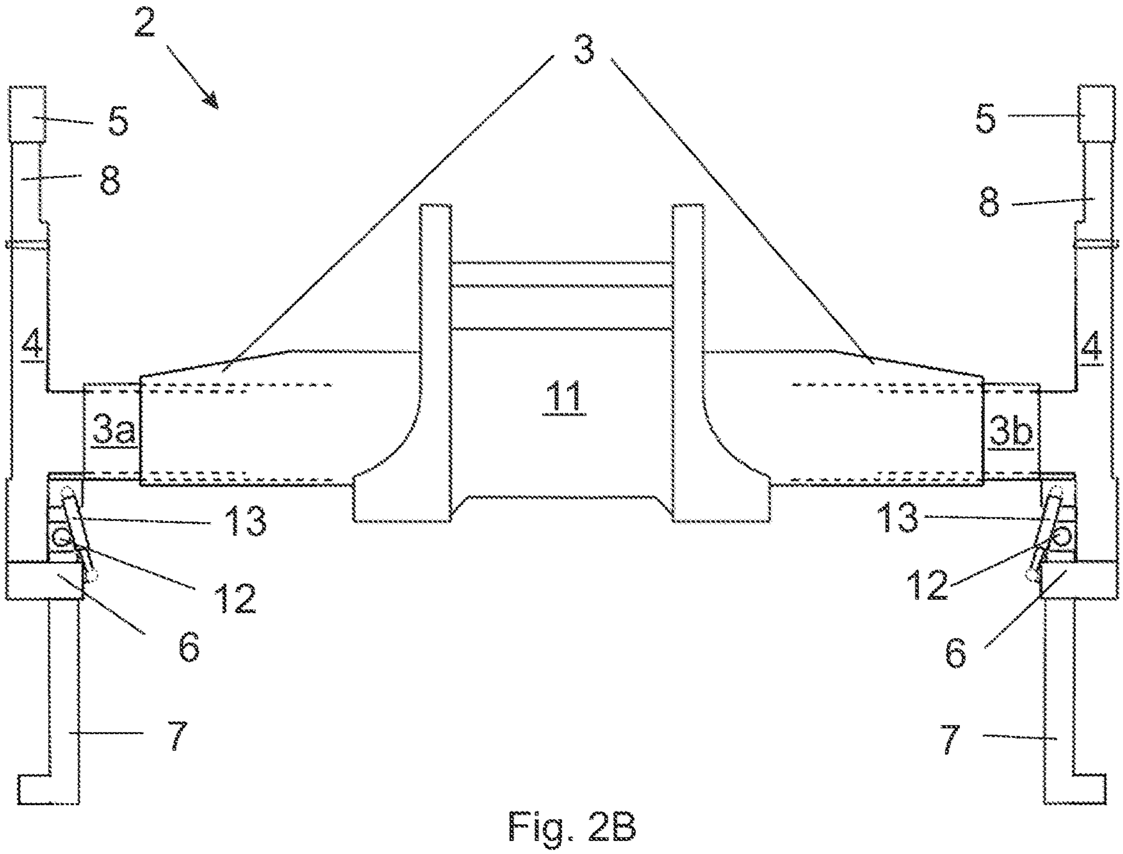
Figure 3B:
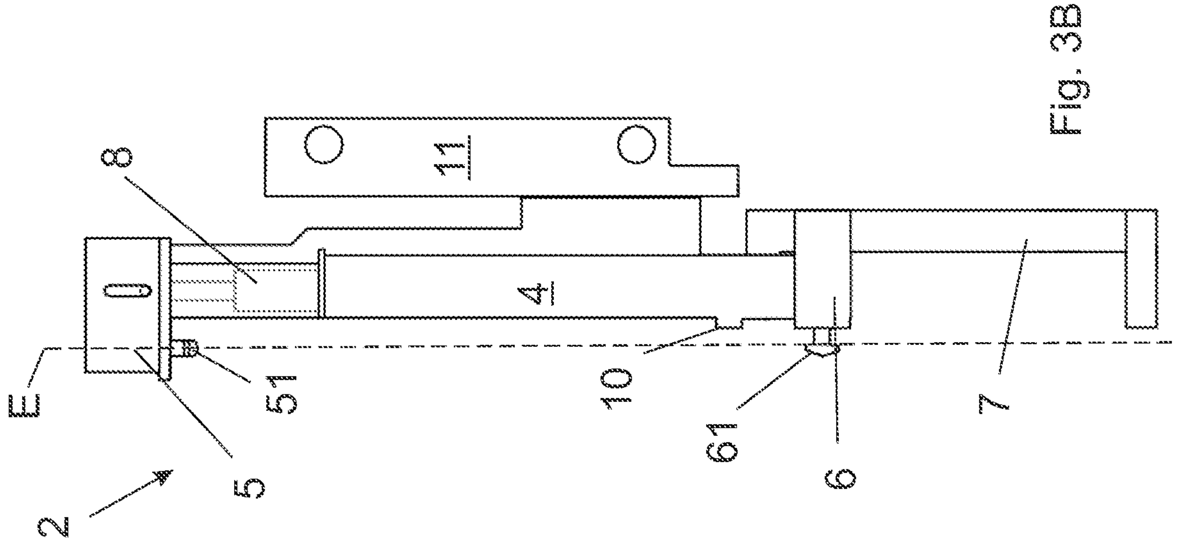
FIGS. 3A and 3B illustrate a side view of the lifting attachment according to the embodiment of FIGS. 1A-1C.
Figure 3A:
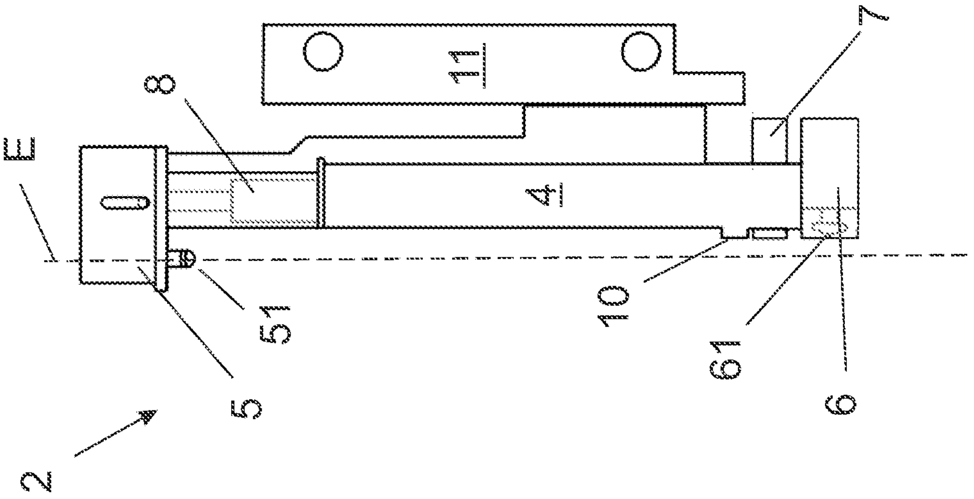

FIGS. 2A and 2B illustrate a back view (as viewed from the operator's cabin 202 side) of the lifting attachment 2 according to the embodiment of FIGS. 1A-1C. FIGS. 3A and 3B illustrate a side view of the lifting attachment 2 according to the embodiment of FIGS. 1A-1C. A lifting attachment base 11 is arranged to move up and down along the lifting mast 1. The lifting attachment 2 comprises the lifting attachment base 11, a lifting attachment frame 3 and arms 4 on each side of the lifting attachment frame 3. One arm 4 is situated on left and another arm 4 on the right side of the lifting attachment 2 when viewed from the operator's cabin 202, and the distance between the arms 4 can be adjusted to match container's length by sliding parts 3*a*, 3*b*. Each arm 4 comprises an upper locking mechanism 5 and a lower locking mechanism 6. An extension 7 is provided next to the lower locking mechanism 6.

The lifting attachment frame 3 is mounted to a lifting attachment base 11 in an essentially horizontal position. The mounting may be fixed or allow moving the lifting attachment frame 3 relative to the base as explained below. The lifting attachment 2 comprises the sliding parts 3*a*, 3*b* which can carry the arms 4 at a relatively same height from the ground. The arms 4 are connected to the sliding parts 3*a*, 3*b* in the lifting attachment frame 3. Sliding part 3*a* is at left side as viewed from the operator's cabin 202 and sliding part 3*b* is at right side as viewed from the operator's cabin 202. In some implementations, the frame 3 can be rotated clockwise or anti-clockwise and/or moved sideways as viewed from the operator's cabin 202.

Each arm 4 comprises the upper locking mechanism 5 at its upper end and the lower locking mechanism 6 at its lower end. In this implementation, a lock to lock into the corner casting is a vertical or horizontal twist-lock 51, however, other type of locks can also be used. Normally two twist-locks 51 are connected to the upper corner castings of the container closer to the operator's cabin 202 side when twist-locks 51 are inserted to the corner castings vertically, meaning from the top of the container. However, in some implementations, the twist-locks 51 are inserted to the corner castings horizontally, meaning from the side of the container, which can be two corner castings from one longitudinal side or one corner casting from each transversal side of the container.

The upper locking mechanism 5 can further comprise a lifting system 8 to adjust vertical position of twist-locks, either separately or simultaneously, by extending vertical distance between lifting attachment frame 3 and twist-locks 51. The lifting system 8 is needed to adjust position of twist-locks 51 and corner castings to adjust the container's vertical position in relation to the lifting attachment 2, and also to lift and lower the upper container so that it can be lowered past the lower locking mechanism, and additionally adjust the height of both upper locking mechanisms 5 to handle containers of different heights. Both upper twist-locks 51 has its own lifting system 8. The lifting system 8 can comprise a telescopic arm, for instance.

The upper locking mechanism 5 can further comprise a free movement portion which allows both twist-locks 51 to land into the corner castings when the container is inclined, and the corner castings have different height from the ground. Alternatively, one upper locking mechanism 5 can be landed first and the second upper locking mechanism 5 is landed within tolerance of free movement, when the lifting attachment 2 and the container to be grabbed are not aligned. The lift truck is inclined while both upper locking mechanisms 5 cannot land at the same time to the corner castings. The free movement portion can move freely, for example 10-30 cm up and down, which allows the upper twist-locks 51 to be lowered and lifted together with the lifting attachment frame 3 when the lifting attachment frame 3 and the container has a different angle. The gravity keeps the free movement portion down but when both upper twist-locks 51 are lowered on top of the inclined container, one twist-lock 51 will touch the container first and both twist-locks 51 can be lowered within range of the free movement, until both twist-locks 51 are ready to connect.

When one twist-lock 51 is engaged to its respective corner casting, the lifting attachment 2 can be lowered so that the other twist-lock 51 is engaged to its respective corner casting. When the lifting attachment 2 is lowered to grab the container's upper corner castings, both twist-locks 51 are lowered simultaneously together with the lifting attachment 2. The first twist-lock 51 stops to its respective corner casting and the lifting attachment 2 continues lowering for the second twist-lock 51. When both twist-locks 51 are moved with lifting attachment frame 3, first twist-lock 51 stays in its respective corner casting because of the free movement portion while the second twist-lock 51 is still being lowered. The arms 4 may also comprise a protrusion 10 for supporting the upper container from its side. The protrusion 10 is in the fixed connection with the arm 4.

The lower locking mechanism 6 can comprise a twist-lock 61, a hook (similar as a hook 62 shown in FIG. 5), a rotatable locking mechanism (similar as a rotatable locking mechanism 63 shown in FIG. 5) or combination of the hook and the rotatable locking mechanism or other locking element of gripping the container from its sides. The lower locking mechanisms 6 are for gripping corner castings of the containers from sides so that the locking element (twist-lock, hook, rotatable locking system) is horizontally pushed inside the corner castings through side openings of the container. Some of the implementations are described below.

In one implementation, the lower locking mechanism 6 comprises twist-locks 61 which are used to grab container from longitudinal side as viewed from the operator's cabin 202 by connecting the twist-locks 61 horizontally from the side of corner castings of the lower container. The lower locking mechanism 6 can also comprise free movement portions as described above. In another implementation, the twist-locks 61 are used to grab the container from transversal sides by inserting the twist-locks 61 through the vertical oval holes 99 of the corner castings. The lower locking mechanism 6 can also comprise free movement portions as descripted above and also up and down free movement as described with upper locking mechanism 5.

In another implementation, the lower locking mechanism 6 can comprise a hook (similar as hook 62 shown in FIG. 5) only. The hook is arranged to be inserted into the corner casting of the longitudinal side of the lower container. The hook can be contracted inside the lower locking mechanism 6 in a resting position and elongated when in an operating position. When contracted, the hook does not obstruct the way of the upper container when the upper container is lowered.

Figure 4:
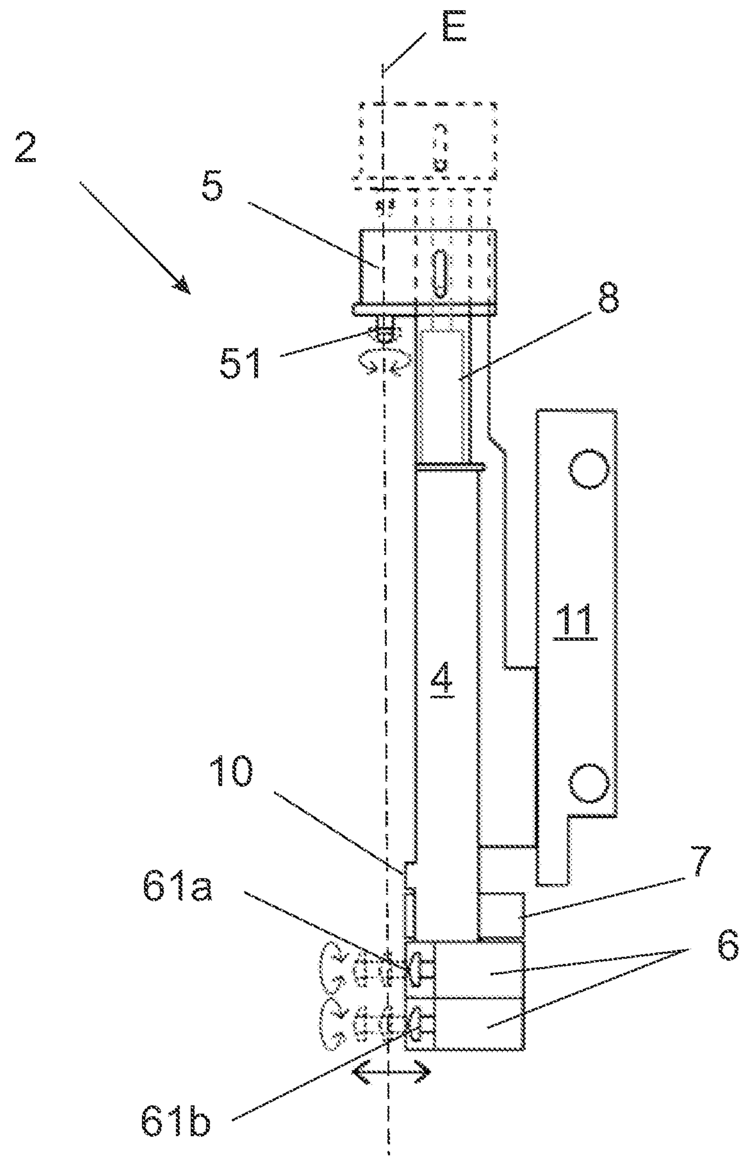
FIG. 4 illustrates another side view of the lifting attachment according to the embodiment of FIGS. 1A-1C.

FIG. 4 illustrates another side view of the lifting attachment according to the embodiment of FIGS. 1A-1C. In this implementation, the lower locking mechanism 6 comprises two twist-locks 61 on top of each other which are herein named as the first lower twist-lock 61*a* and the second lower twist-lock 61*b*. The lower twist-locks 61 can be arranged to grab the containers from the longitudinal sides or the transversal sides of the container, which can be two corner castings from one longitudinal side or one corner casting from each transversal side of the container.

The lower twist-locks 61 can be arranged to contract inside the lower locking mechanism 6. The first lower twist-lock 61*a* is contracted inside the lower locking mechanism 6 in a resting position and elongated when in an operating position. When contracted, the first lower twist-lock 61*a* or both lower twist-locks 61 do not obstruct the way of the upper container when the upper container is lowered.

As an alternative to contracting the lower twist-locks 61, the lower locking mechanism 6 can comprise a mechanism (not shown in Figures) to move the first 61*a* or both lower twist-locks 61 sideways while the upper container is lowered in such way that the lower twist-locks 61 are not obstructing the way.

When the lower locking mechanism 6 comprises two twist-locks 61, the first lower twist-lock 61*a* can grab the bottom corner castings of the upper container while the second lower twist-lock 61*b* can grab the upper corner castings of the lower container. This facilitates and fastens picking two containers on top of each other at the same time in such way that only the lower locking mechanism 6 is grabbing the containers and there is no need to use the upper locking mechanism 5. When picking two containers, the first lower twist-lock 61*a* can be locked first and when landing the second lower twist-lock 61*b* can be released first. It is also possible to pick two containers on top of each other, so that the first lower twist-locks 61*a* are contracted and the second lower twist-locks 61*b* are engaged to the upper corner castings of the lower container and lift both containers while the upper container is balanced on top of the lower container. The lower twist-locks 61*a* and 61*b* can be controlled separately so that the first lower twist-lock 61*a* can have longer horizontal movement to attach the upper container and pull it back and align with the lower container.

With this implementation, the upper vertical twist-locks 51, the lower horizontal locking system 6 and the extension 7 makes it possible to change locking methods of the container when containers are picked. This applies to all the implementations with a hook or a twist-lock. As shown in FIG. 1C, the arrangement allows picking up two stacked containers without using the upper locking mechanism 5. The upper container is first picked up with the upper twist-locks 51 and the lower container with the second lower twist-locks 61*b*. The upper container is then lowered by the upper twist-locks 51 so that the upper container is landed on the top of the lower container and locked in place with the first lower twist-locks 61*a* from the bottom corner castings of the upper container. That way the containers are handled together as stacked.

This arrangement works also vice versa, wherein the containers can be lowered together as a stack or separately. When lowering the containers separately, the lower twist-locks 61 are released first when releasing the lower container while the upper twist-locks 51 are still locked with the upper container. The upper container can then be released separately by lowering the lifting attachment 2 and releasing the upper twist-locks 51.

Figure 5:
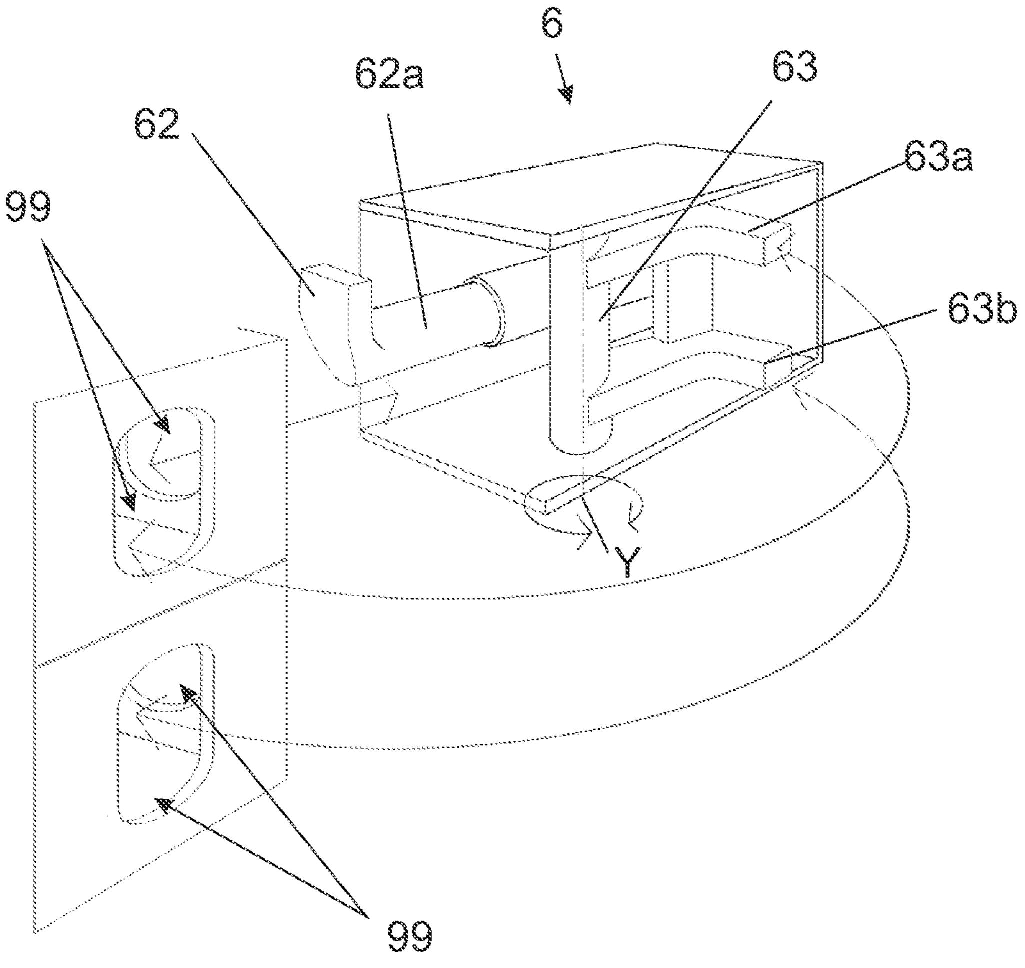
FIG. 5 illustrates a closer view of a lower locking mechanism.

FIG. 5 illustrates yet another implementation, wherein the lower locking mechanism 6 can comprise a rotatable mechanism 63 with an upper holder 63*a* and a lower holder 63*b*. The term "holder" refers to a protrusion, a rotatable locking system or a hook arranged to fit at least partially inside an oval hole 99 of a corner casting of a container. The upper holder 63*a* is arranged to be inserted at the lower corner casting of the transversal side of the upper container and the lower holder 63*b* is arranged to be inserted into the upper corner castings of the transversal side of the lower container. Both upper holder 63*a* and lower holder 63*b* can rotate together around a vertical axis Y. In this context, the vertical axis Y refers to a straight line around which the holders 63*a*, 63*b* rotate wherein the line is essentially a parallel vertical line between the upper locking mechanism 5 and lower locking mechanisms 6. The upper 63*a* and lower holder 63*b* can be in fixed connection or move separately. When in fixed connection, the upper holder 63*a* holds the weight of the lower container via the lower holder 63*b*. The upper holder 63*a* and lower holder 63*b* can be manufactured with one solid cast piece or welded together from several pieces. Alternatively, the upper and lower holders 63*a*, 63*b* can be in two or more pieces, which are assembled together or separately to the lower locking mechanism 6. The upper and lower holders 63*a*, 63*b* can have mutual or separate hinges for rotating around the vertical Y axis. In some implementations, the upper and lower holders 63*a*, 63*b* can be controlled separately.

In some implementations, a hook 62 comprising a hook arm 62*a* can be arranged above, below or at the same level as the rotatable mechanism 63. The hook arm 62*a* can be designed as a straight or curved portion with a curved tip. The hook 62 can be inserted into the lower corner casting of the longitudinal side of the upper container as viewed from the operator's cabin 202, while the rotatable mechanism 63 rotates the upper holder 63*a* into the lower corner casting of the upper container and the lower holder 63*b* into the upper corner casting of the lower container to lock the containers from the transversal sides. The lower container's weight is carried by the rotatable mechanism 63 as the lower container is engaged by the lower holder 63*b* and the extensions 7 are supporting the lower container by taking side forces.

The hook 62 prevents the upper container to drop during the lifting or transportation. As the oval hole 99 of the corner casting is large enough to easily set the locking inside, there is a possibility that the container jumps and falls out of the hook 62. The upper holder 63*a* is rotated inside the corner casting to prevent such jumping. The holders 63*a*, 63*b* can be placed between the hook 62 or the hook arm 62*a* and the container structure so there is no space to move and the container cannot jump and fall out of the hook 62. The holder can be placed above, below of side of the hook 62 or the hook arm 62*a* so that the tip of the hook 62 secures the container horizontally and the hook 62 or the hook arm 62*a* carries the vertical forces, and possibly some of the horizontal forces.

The hook 62 can alternatively be inserted into the upper corner casting of the longitudinal side of the lower container as viewed from the operator's cabin 202. With this arrangement, it is possible to lift and carry the upper container on top of the lower container. Rotatable locking system 63 can be used to lock the upper and lower containers together. The hook 62 or the hook arm 62*a* can carry the weight of both lower and upper containers and the rotating locking system 63 can carry horizontal forces of the containers and prevent the container from dropping. The lower holder 63*b* can secure the container from dropping off the hook 62 as previously explained and the upper holder 63*a* can prevent the upper container from sliding or moving sideways.

The hook 62 or the hook arm 62*a* can be contracted inside the lower locking mechanism 6 in a resting position and elongated when in an operating position. When contracted, the hook 62 or the hook arm 62*a* does not obstruct the way of the upper container when the upper container is lowered. The hook 62 and the rotatable locking movements can be actualized electrically, hydraulically or pneumatically. In some implementations, the hook 62 or the hook arm 62*a* can be replaced with a twist-lock.

The control of the hook 62, the hook arm 62*a* or the rotatable locking system 63 with holders 63*a*, 63*b* and/or other container engaging devices can be interlocked with load weighing systems and/or with systems and devices monitoring the actual status and operation of the load engaging devices. Such interlocks may be needed both to ensure safe operation and to ensure correct operating sequences of the system.

The hook 62, the hook arm 62*a* or the rotatable locking system 63 with holders 63*a*, 63*b* can be connected to a load sensor for sensing or measuring load to define if there is a container weighting on the hooks 62 or if the container has landed on the ground or on top of another container. The sensors for the load can be electric sensors such as, for example, a strain gauge. The hook 62 or hook arm 62*a* can be additionally connected to a position sensor to measure position and status of the hook 62 or the hook arm 62*a*. Position sensors can be, for example, an angle sensor, a limit switch or an inductive or a capacitive switch.

The sensors can be part of automation by holding the hook 62 or the rotatable locking system 63 and preventing its movement if an operator seated in the operator's cabin 202 of lift truck accidently switches its controls from the operating position to the resting position. If information of the load sensor indicates that the container has not landed or fully landed on the ground or on top of another container, the hook 62 or the rotatable locking system 63 will not release the container.

The information obtained from said sensors can be shown to the operator by indicating with on/off lamps or different color, for instance. The indication can additionally be shown at the lifting attachment 2. When the lifting attachment 2 is carrying the upper and the lower container separately as described above, the weight of the upper and/or lower container is registered or measured and the upper container can be landed to top of the lower container and locked by the lower locking mechanism 6.

FIGS. 2A, 3A and 4 illustrate the extension 7 in the resting position and FIGS. 2B and 3B illustrate the extension 7 in the operating position. This should not be confused with the resting and operating positions of the hook 62 or the lower twist-locks 61 as the extension 7 and the hook 62 or the twist-lock 61 are separately operable. The extension 7 allows handling the upper container in the upper locking mechanism 5 in such way that when the extension 7 is in the resting position, the upper container can be lowered to the ground as the lifting attachment 2 is moved vertically down so that the bottom of the container is then lower than the lowest part of the extension 7.

The extension 7 is attached to the arm 4 through a pivot point 12 situated above or below the lower locking mechanism 6 but in some embodiment, the pivot point 12 can situate next to the lower locking mechanism 6. The extension 7 moves from the resting position to the operating position around the pivot point 12. An actuator 13 connected to the extension 7 moves the extension 7 in relation to the pivot point 12 using a telescopic arm, for instance. One end of the actuator 13 can be in a fixed or hinged connection to a side of the extension 7, where said side is towards the vertical axis of the lifting attachment 2 in the resting position, and another end can be in a fixed or hinged connection to the arm 4. The actuator 13 is connected to the control system of the lifting attachment 2 and the actuation can be realized by hydraulic, pneumatic, electric or mechanical means. The extension 7 can be also moved by other means, for example by arranging a gear-type machinery at the pivot point 12.

Figure 6:
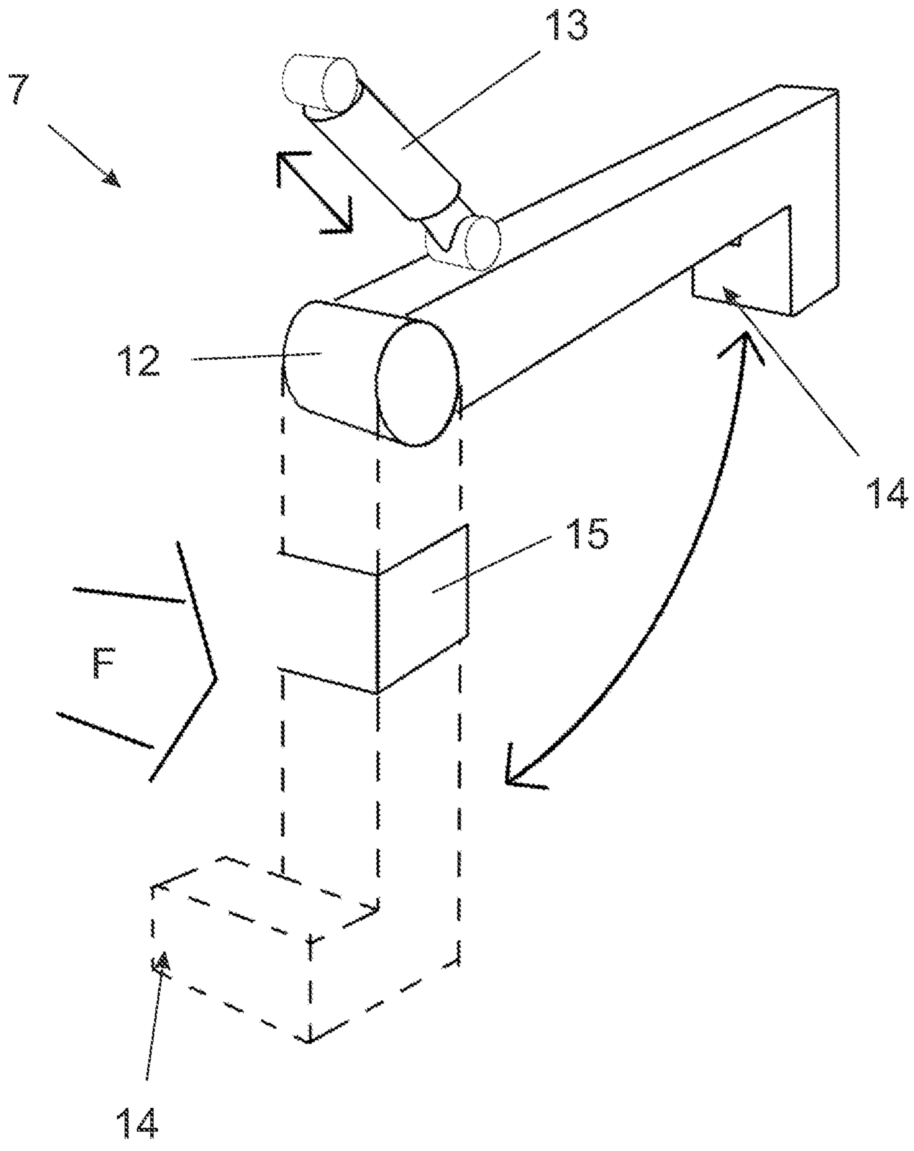
FIG. 6 illustrates a closer view of an extension according to the embodiment of FIGS. 2A and 2B.

FIG. 6 illustrates a closer view of the extension 7 according to the embodiment of FIGS. 2A and 2B. The extension 7 is arranged to provide a side support to the lower container and by that prevent the container from tilting. The extension 7 comprises a proximal end and a distal end. The proximal end comprises the pivot point 12 connecting the extension 7 to the arm 4 and the distal end comprises a support portion 14. The support portion 14 at the distal end can be perpendicularly elongated from the extension 7 for supporting force F caused by weight of the lower or upper or both containers. The support portion 14 is in the fixed connection with the extension 7. The width of the support portion 14 can be same or smaller as the width of the extension 7 and the surface area vary from square to rectangular.

The extension 7 can be stronger in the opposing direction of the force F compared to the perpendicular direction of the force F. In FIG. 6, the extension 7 is illustrated as a bar with a right-angled transversal cross-section. However, the shape of the extension 7 is not essential as it only need to be ensured that the contact surface, against which the container leans at the distal end of extension 7, allows for supporting the force F. In some embodiments, the transversal cross-section can be rounded or circular. Additionally, the extension 7 is illustrated as straight but in some embodiments, the extension 7 can be curved or bent or include two or more parts connected to each other.

In the resting position the distal ends are turned to move the support portions 14 closer to each other and in the operating position the distal ends are turned towards the ground. In the resting position the lowest point of the extension 7 is at same level or above the lower locking mechanism 6 so that when the upper container is lowered to the ground or picked up from the ground, the extension 7 stays above the bottom of the upper container. In some embodiment, when in the resting position, a line between the proximal end and distal end of the extension is in less than 45 degree angle with the lifting attachment frame 3, and more preferably horizontal or parallel to the lifting attachment frame 3 such that distance between the distal ends of the extensions 7 are closest to each other. In another embodiment, the extension 7 may be slightly turned away from the lifting attachment frame 3 when in the resting position in such way that the extension 7 forms less than 40 degree angle with the lifting attachment frame 3 plane, more preferably less than 24 degree angle and most preferably less than 10 degree angle.

In the operating position the line between the proximal end and distal end of the extension 7 can be parallel to the arm 4. Optionally, in some embodiments, the support portion 14 of the distal end of the extension 7 is within 50 cm from the extrapolated line E (as illustrated in FIGS. 3-4) between the upper locking mechanism 5 and the lower locking mechanism 6, and more preferably within 15 cm from the extrapolated line E, and most preferably within 5 cm from the extrapolated line E between the upper locking mechanism 5 and the lower locking mechanism 6. The term "extrapolated line" refers to a continuation of the line between the twist-lock 51 of the upper locking mechanism 5 and the twist-lock 61, hook 62 or rotatable locking system 63 of the lower locking mechanism 6, as shown in FIGS. 3 and 4. When the containers are locked with the lifting attachment 2, this extrapolated line is also between the center of the left (and right) corner castings of the upper and lower container.

The extensions 7 change the equilibrium position of the lower container such that the container does not tilt as much as it would otherwise. This is because the support portion 14 of the extension 7 pushes against the longitudinal side of the container, counteracting force F of the torque. The pivot point 12 can be a hinge and most of the stress is focused on it and the support portion 14. Therefore, length of the hinge is preferably greater than diameter of the hinge. In some embodiments, the pivot point 12 can be a bearing or a ball joint.

For counteracting the abovementioned forces F, at least one extension sleeve 15 can be arranged to support the extension 7 between its proximal end and distal end. The extension sleeves 15 reduce significantly the targeted forces to the pivot point 12. In one embodiment the extension sleeve 15 can carry the counter forces and also stop or limit an angle or position of the extension 7 which therefore will set a correct place of the support portion 14 in the operating position.

The extension sleeve 15 can be for instance reinforced steel plate arranged partially around the extension 7 such way that it covers at least a side of the extension 7 parallel to the pivoting plane. In case the transversal cross-section is circular, the extension sleeve 15 is arranged to cover at least a part of the circumference of the extension 7 parallel to the pivoting plane. This prevents bending of the extension 7 when the forces F are concentrated towards the pivot point 12 and the support portion 14. The extension sleeve 15 can be attached to the arm 4 in such way that in operating position, the extension 7 fits within the extension sleeve 15. The more distance between the extension sleeve 15 and the pivot point 12, the less forces F are concentrated to the pivot point 12. However, the extension sleeve 15 should preferably situate above the lowest point of the lower locking mechanism 6. The extension sleeve 15 can be at the same level or above the lowest point of the lifting attachment 2 or the pivot point 12. For each extension 7, the extension sleeve 15 and the pivot point 12 are arranged in the arm 4 of the lifting attachment 2. With the above-mentioned extension sleeves 15, the lower container can be steadily supported.

The invention claimed is:

1. A lifting attachment, comprising:

a lifting attachment frame, and an arm on each end of the lifting attachment frame, wherein the arm comprises an upper locking mechanism configured to graban upper container and a lower locking mechanism configured to grab a lower container, the upper locking mechanism being at a first end of the arm and the lower locking mechanism being at a second end of the arm opposite the first end, wherein the arm is configured to lift the upper and lower containers simultaneously, wherein each arm further comprises a pivotable extension provided at the second end of the arm next to the lower locking mechanism and connected to an actuator, wherein a proximal end of the extension comprises a pivot point connecting the extension to the arm and a distal end of the extension comprises a support portion, wherein in a resting position the distal ends of the extensions are turned to move the support portions closer to each other and in an operating position the distal ends of the extensions are turned downwards for supporting the lower container from its longitudinal side.

2. The lifting attachment according to claim 1, wherein in the resting position the lowest point of the extension is at same level or above the lower locking mechanism.

3. The lifting attachment according to claim 1, wherein in the resting position a line between the proximal end and distal end of the extension is in less than 45-degree angle with the lifting attachment frame.

4. The lifting attachment according to claim 1, wherein in the operating position the support portion of the distal end of the extension is within 50 cm from an extrapolated line between the upper locking mechanism and the lower locking mechanism.

5. The lifting attachment according to claim 1, wherein the pivot point is a hinge, and length of the hinge is greater than diameter of the hinge.

6. The lifting attachment according to claim 1, wherein the extension comprises an extension sleeve between the proximal end and the distal end of the extension.

7. The lifting attachment according to claim 6, wherein the extension sleeve is a reinforced steel plate surrounding partially around the extension.

8. The lifting attachment according to claim 1, wherein the support portion at the distal end is perpendicularly elongated from the extension for supporting force caused by weight of the lower container.

9. The lifting attachment according to claim 1, wherein the actuator comprises a telescopic arm.

10. The lifting attachment according to claim 9, wherein one end of the telescopic arm is in a fixed or hinged connection to a side of the extension, where said side is towards the vertical axis of the lifting attachment in the resting position.

11. The lifting attachment according to claim 1, wherein the upper locking mechanism comprises a lifting system for adjusting vertical position of the upper locking mechanism.

12. The lifting attachment according to claim 1, wherein the arm comprises a fixed protrusion for supporting force caused by weight of the upper container.

13. The lifting attachment according to claim 1, wherein the lower locking mechanism comprises a first lower twist-lock and a second lower twist-lock.

14. The lifting attachment according to claim 1, wherein the lower locking mechanism comprises a rotatable locking system comprising an upper holder and a lower holder.

15. The lifting attachment according to claim 14, wherein the lower locking mechanism further comprises a hook arranged to be inserted in an oval hole of the lower corner casting of the upper container.

16. The lifting attachment according to claim 14, wherein the lower locking mechanism further comprises a hook arranged to be inserted in an oval hole of the upper corner casting of the lower container.

17. A lifting device, comprising the lifting attachment according to claim 1, wherein the lifting device further comprises a lifting mast, wherein the lifting attachment is movably attached to the lifting mast.

* * * * *